United States Patent [19]
Cherry

[11] Patent Number: 5,301,185
[45] Date of Patent: Apr. 5, 1994

[54] RING COMMUNICATION SYSTEM

[75] Inventor: Michael F. Cherry, 12 Mount Coburn Crescent, Peacehaven, East Sussex BN10 8DW, Great Britain

[73] Assignee: Michael Frank Cherry, Peacehaven, Great Britain

[21] Appl. No.: 678,211

[22] Filed: Apr. 1, 1991

[30] Foreign Application Priority Data

Apr. 4, 1990 [GB] United Kingdom ............... 9007600

[51] Int. Cl.$^5$ ............................................ H04L 12/42
[52] U.S. Cl. ................................ 370/16.1; 370/85.15; 340/825.05
[58] Field of Search ............... 370/16, 16.1, 85.1, 370/85.13, 85.14, 85.15, 85.7, 85.12, 60, 60.1, 94.1, 94.2; 371/8.1, 8.2, 11.1, 11.2; 340/825.05

[56] References Cited

U.S. PATENT DOCUMENTS 3,742,144  6/1973  Brandenburg et al. ........... 370/85.14
4,887,256 12/1989  Nakayashiki et al. ................. 370/16
5,119,373  6/1992  Fredricsson et al. ............. 370/85.15

FOREIGN PATENT DOCUMENTS

WO84/04761 12/1984 PCT Int'l Appl. .

OTHER PUBLICATIONS

Kositpaiboon, Rungroj et al., Performance of the IEEE 802.6 Metropolitan area Networks using a simple Isochronous Management Protocol, *IEEE*, 1987, pp. 36–45.

Gorss, Siegmar et al., Ein Glasfaser LAN für integrierte Daten-, Sprach- und Video-Anwendungen, *Angewandte Informatik*, May 5, 1989, pp. 203–211.

Primary Examiner—Wellington Chin
Attorney, Agent, or Firm—Burns, Doane, Swecker & Mathis

[57] ABSTRACT

A communication system in which a plurality of nodes or terminal access units 2 are connected via a media ring 3. Data is transmitted in a series of data packets within which the bits or bytes are multiplexed. To ensure line availability and avoid contention and delay each access unit has preassigned channels within the packet.

4 Claims, 12 Drawing Sheets

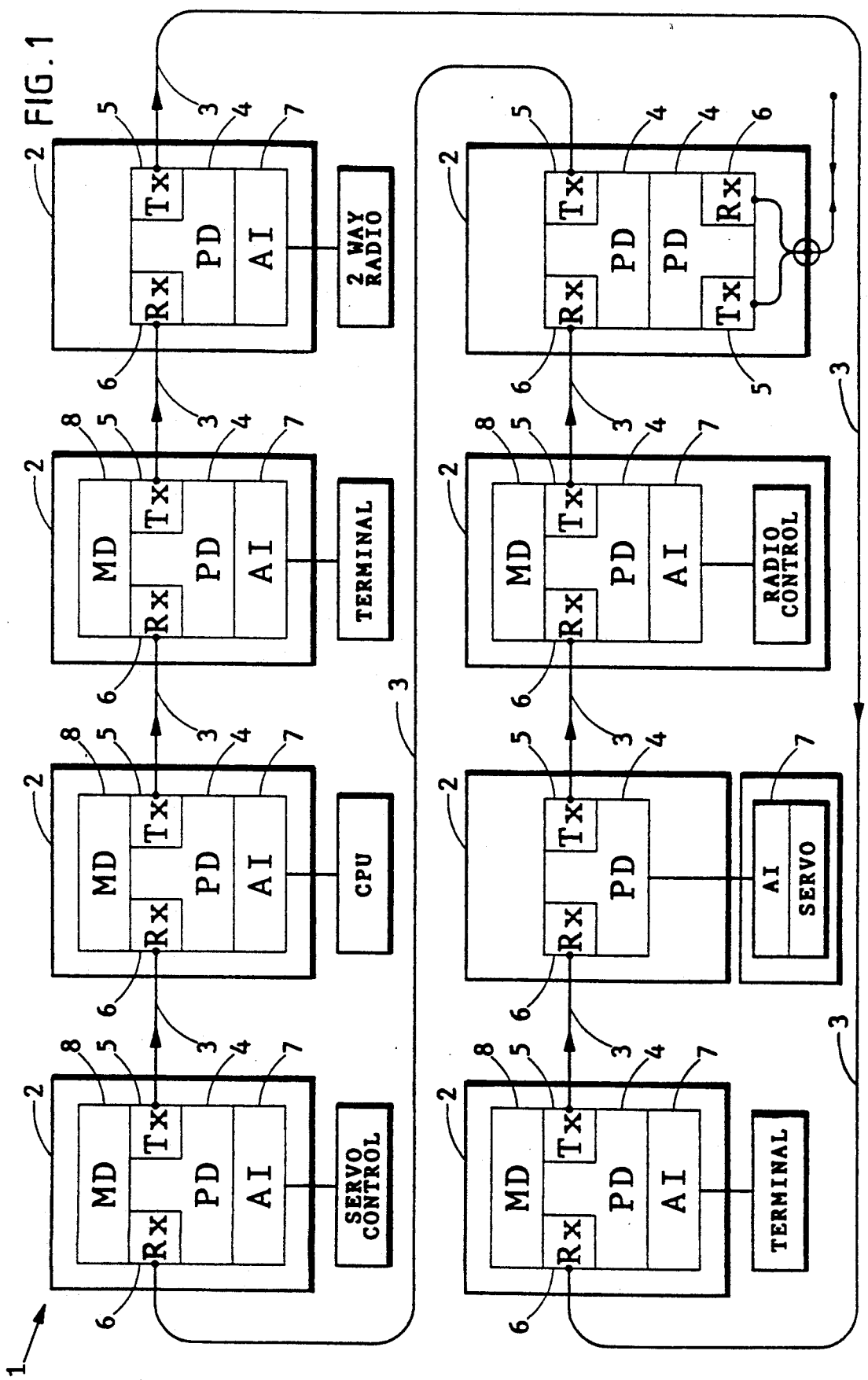

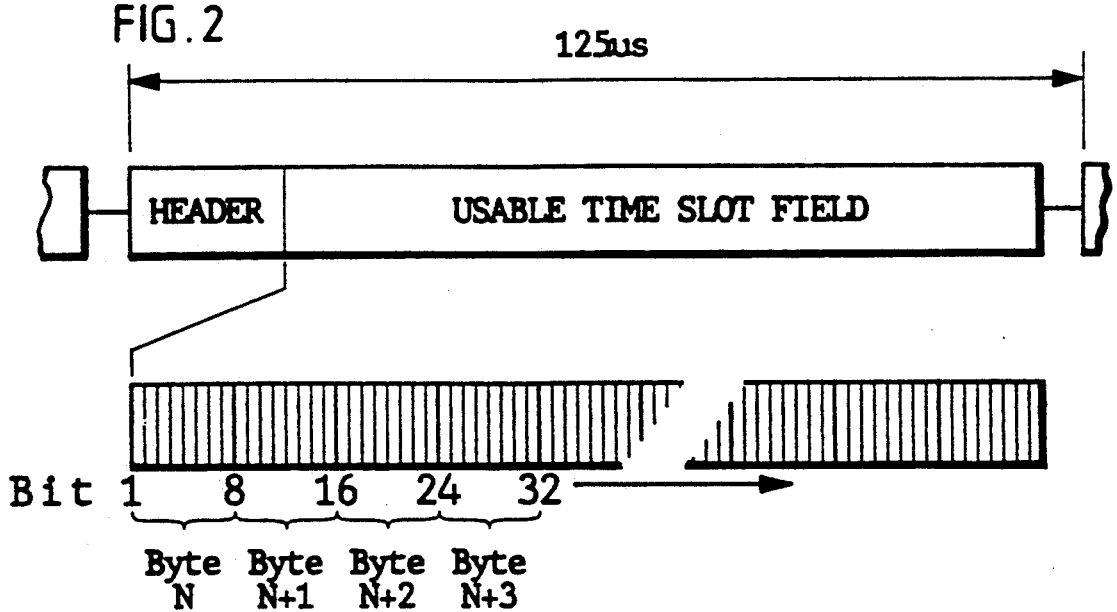
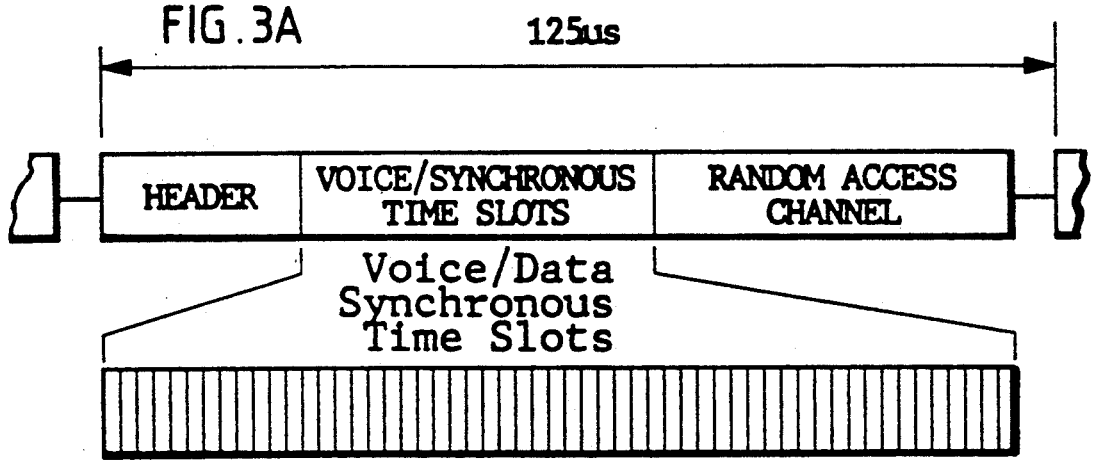
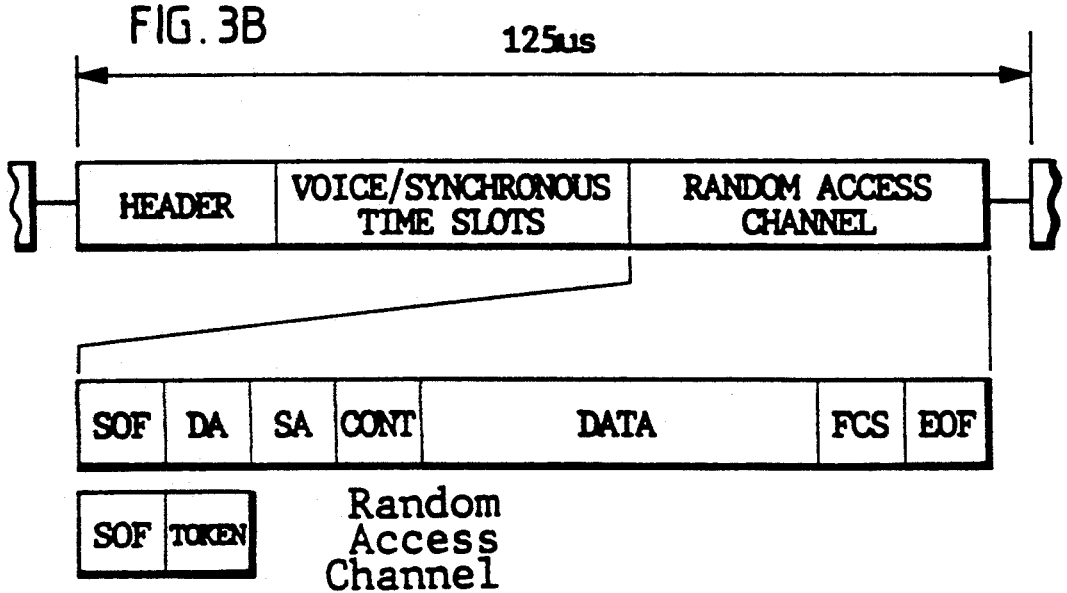

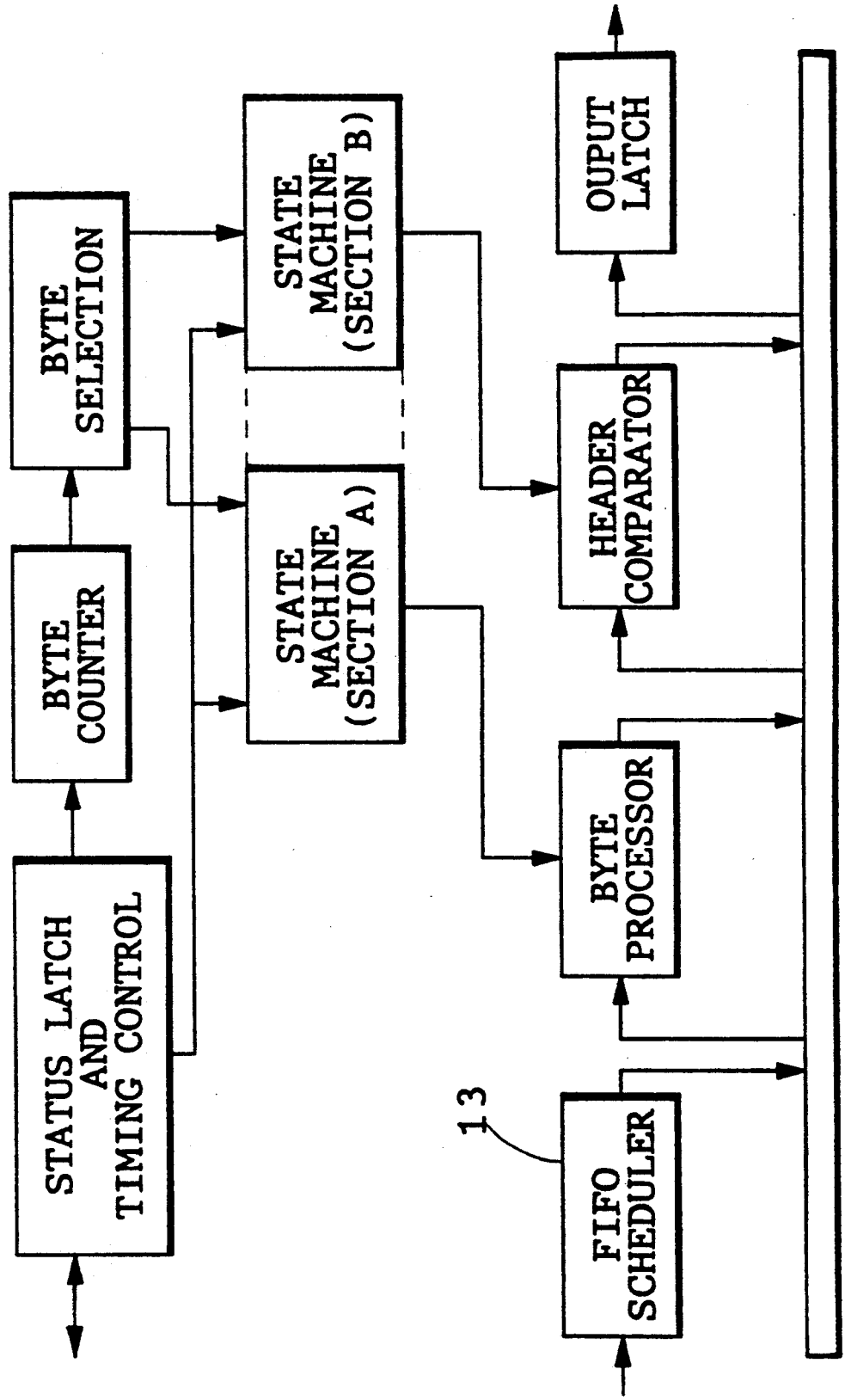

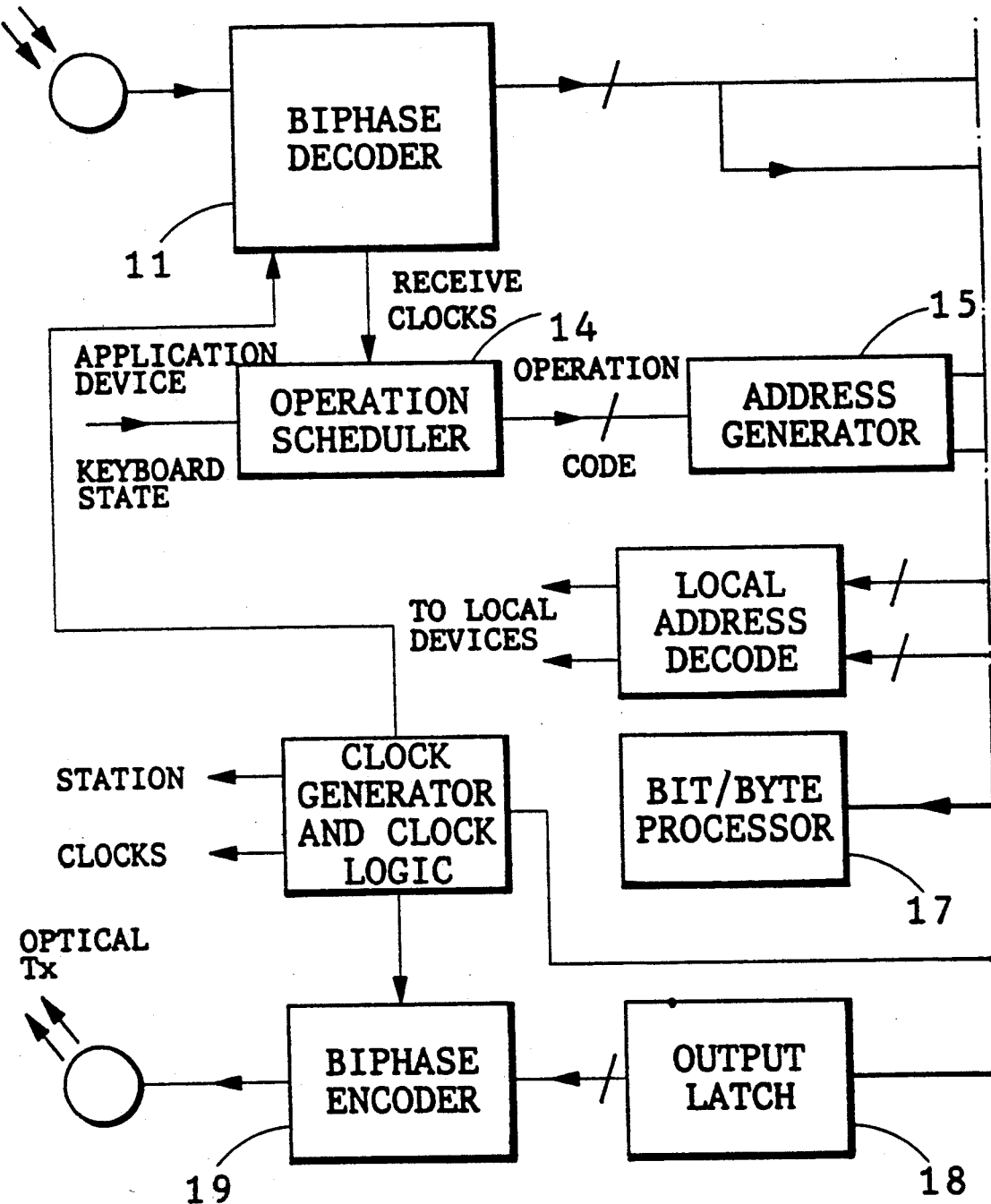
FIG. 6 (1/2)

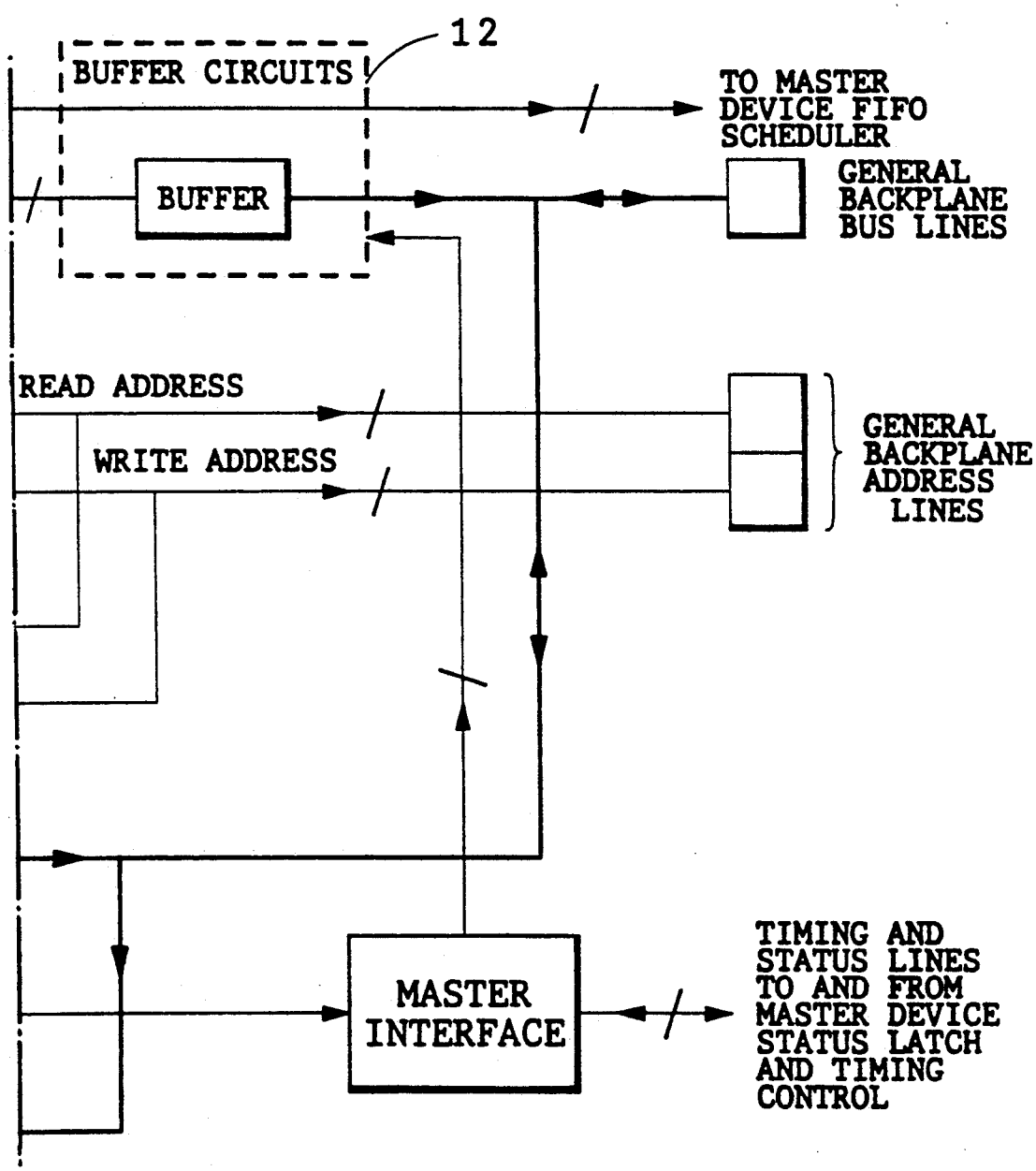
FIG.6 (2/2)

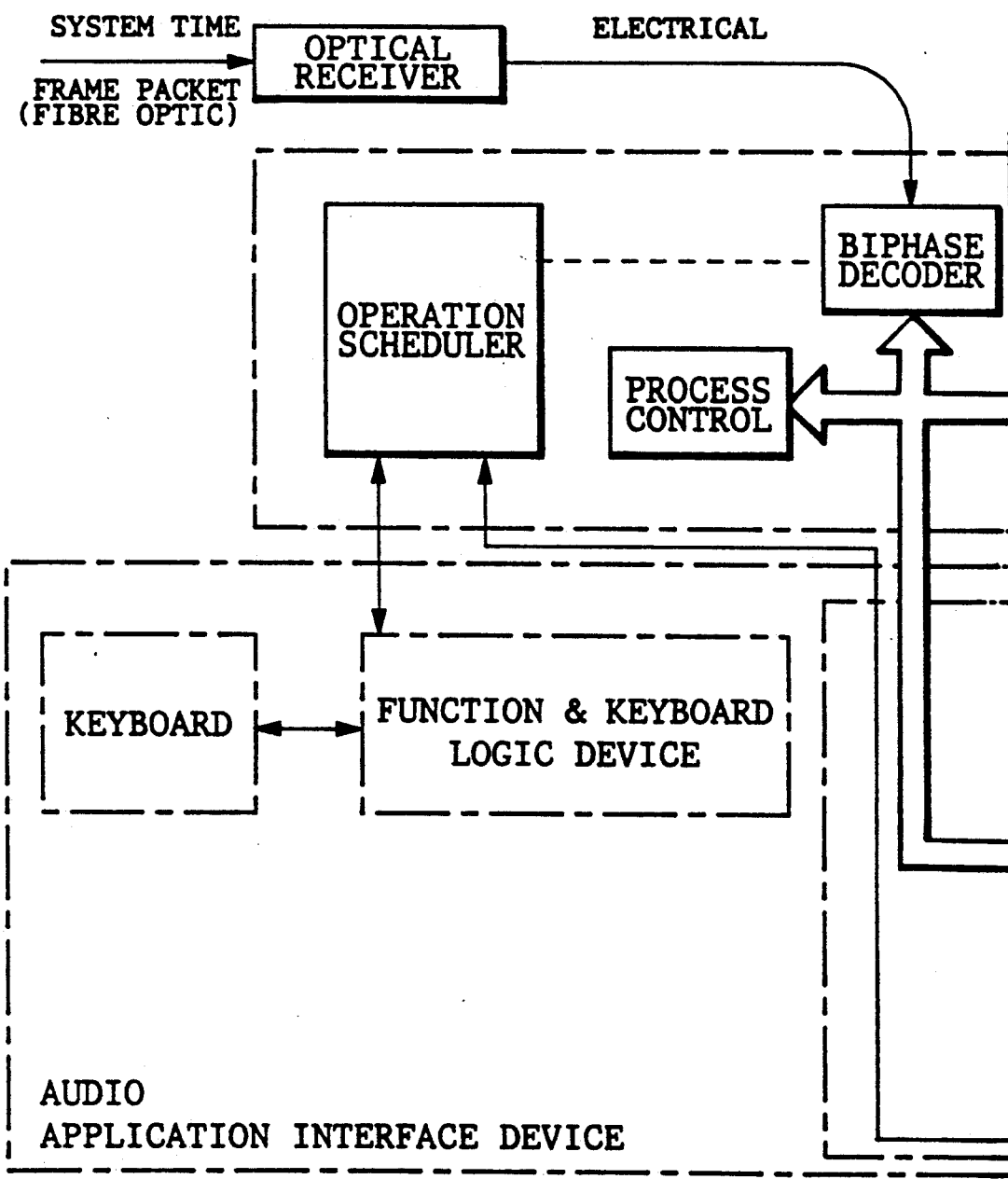

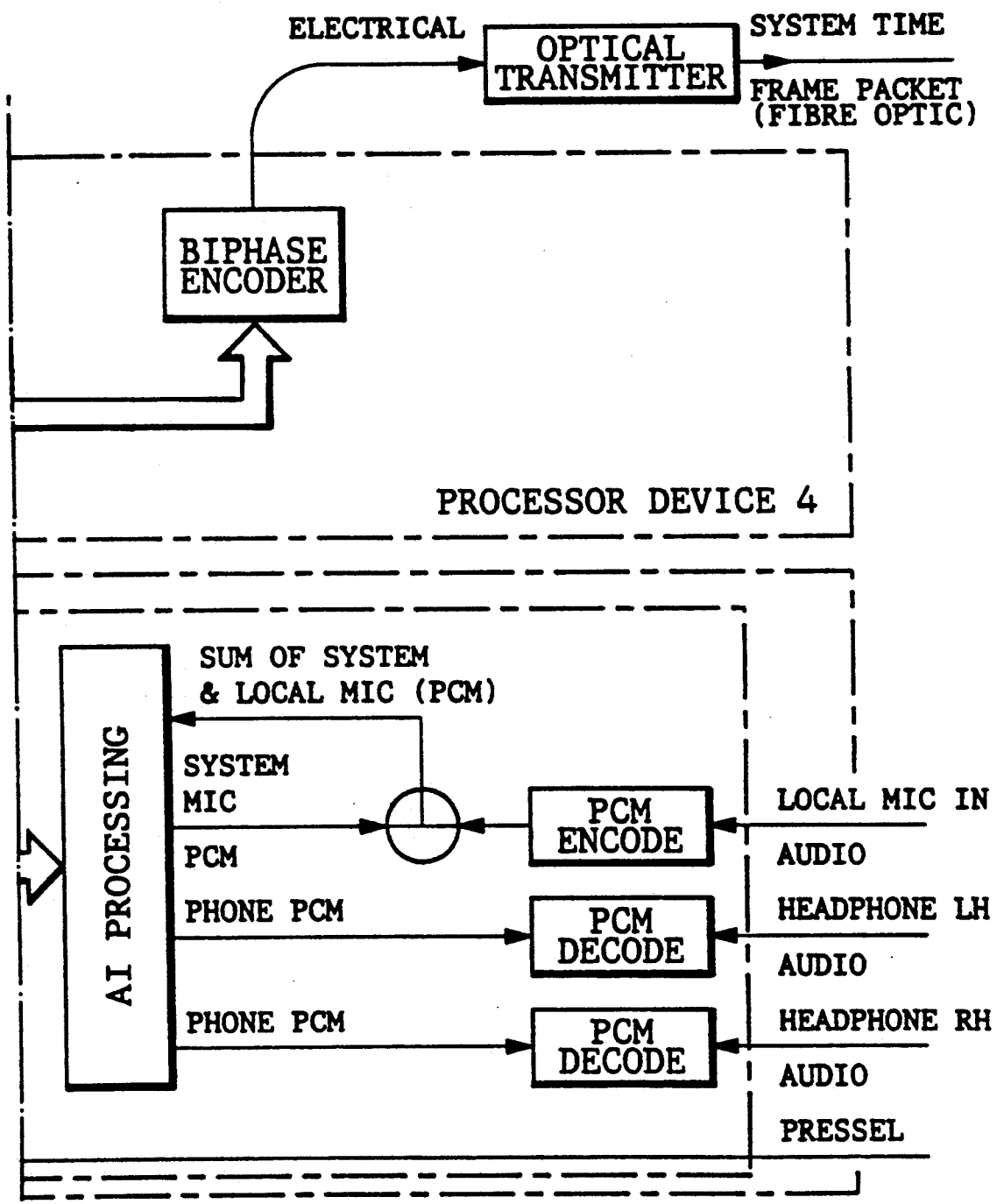
FIG.7 (2/2)

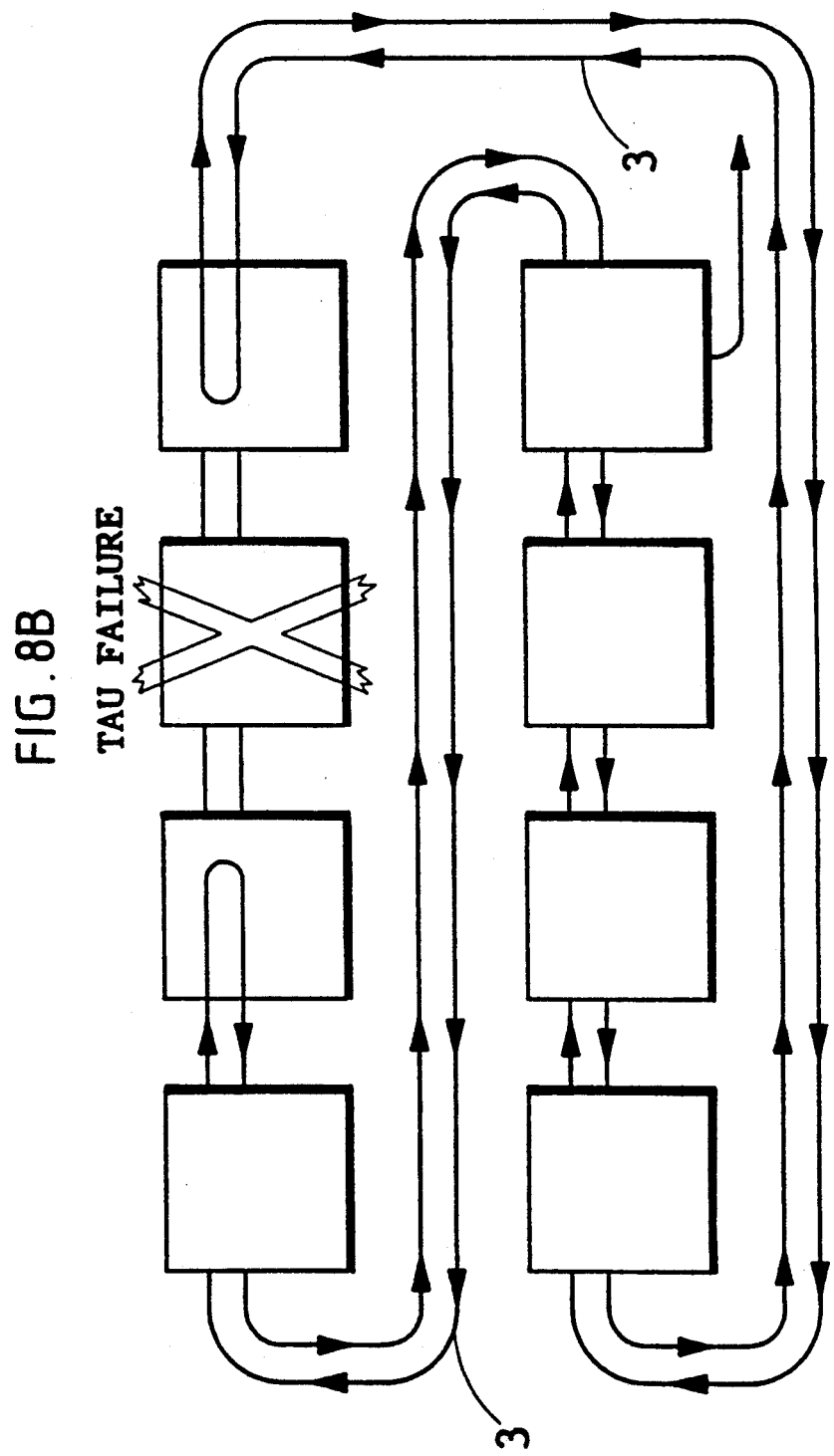

DAMAGE TO MAIN
FIBRE OPTIC MEDIA
RING CABLE

RING COMMUNICATION SYSTEM

This invention relates to communications systems and especially to apparatus and methods utilised in ring systems.

Existing ring communications systems such as the so-called Cambridge ring, in which data or information is circulated in a single direction and connection to the ring for transmission or reception is made at a plurality of nodes, operate on a time division multiplexed basis to provide separate channels. Information from a transmitting node is launched into the system in a standard time frame packet or slot, in digital systems this information is referred to as a word, during which launch of information from other nodes is suppressed. Subsequent time frame packets may contain information launched from other nodes, or from the same node, the sequence of which node is actually launching into the ring being governed by a protocol that essentially shares out the time, or slots, available between the nodes that are transmitting. It is possible to allocate priorities within the protocol so that the allocation of time slots is not equal.

However, this system of time frame packet allocation has drawbacks in that a node wishing to transmit information has to search the packets to see if they are free, leading to time delays which increase as the number of nodes on the system increases. Also, voice communication delays and arbitration can disrupt synchronous transmission. Even where the protocol enables continuous access to sequential time frame packets so that the data is not transmitted in bursts unrelated in real time, there are still delays in gaining access to transmit giving rise to 'busy line' messages.

To cope with voice transmission and large numbers of nodes, systems have been developed in which the time frame packets are subdivided into separately assignable time slots so that more than one node can transmit at once on to sequential packages. However, these systems are concerned with maximising usage of the available data slots and nodes wishing to transmit still have to search the time frame packet for an empty slot, and in the absence of an empty slot an unavailable or busy line indication is given.

In some circumstances such as day to day telecommunications the receipt from time to time of a 'busy line' signal is an acceptable consequence of maximising available line time, and it is with such applications in mind that the prior art has developed.

However, for some applications receipt of 'busy line' signals to a node wishing to transmit is unacceptable, and it is desirable to have a communications network such as a media ring which can support multi-node access without contention.

It is also desirable for communications networks handling vital services to be capable of sustaining as much communication as possible between nodes when the network or media ring is subjected to damage.

The present invention is directed towards overcoming the aforementioned problems, and in particular towards a voice and/or data communication system in which there is access without contention.

Accordingly the present invention provides a transmission system comprising a plurality of access nodes and a data transmission medium on which data is transmitted between nodes in a series of multi-bit time frame packets, bits and/or bytes of the time frame packets being subdivided to provide a plurality of channels within individual time frame packets, and in which each node is programmed to access specific channels within the time frame packets to avoid contention.

In a preferred embodiment of the invention the transmission medium forms a main media ring and a standby transmission ring is connected to the nodes and transmits the time frame packets in the opposite direction from the main media ring when failure of a node or section of the main media ring is detected by a node adjacent the failure.

Preferably the transmission system is interconnected to at least one further transmission system via a bridging unit.

The time frame packets may be provided with header codes that comprise synchronising and channel scheduling information.

A state machine associated with each node may be programmed to access the specific channels assigned to the node. The state machine may sample each byte of a decoded incoming system time frame, buffer the system time frame byte for a predetermined interval during which information in the byte is supplied to an application interface for exchange or augmentation and returned to the state machine in synchronism with output of the original system time frame byte.

The invention is now described by way of example with reference to the accompanying drawings in which:

FIG. 1 shows a typical configuration of a voice and data communication system of the invention;

FIG. 2 shows an example of a system time frame packet adopted in the invention;

FIGS. 3a and 3b illustrate an example of a system time frame packet having both voice/synchronous slots and a random access channel;

FIG. 5 is a block diagram of major functions of a master device in an embodiment of the invention;

FIGS. 6(1/2) and 6(2/2) are a block diagram of major functions of a processor device in an embodiment of the invention;

FIGS. 7(1/2) and 7(2/2) show in more detail a typical voice communication terminal access unit in an embodiment of the invention.

Figure 8A:
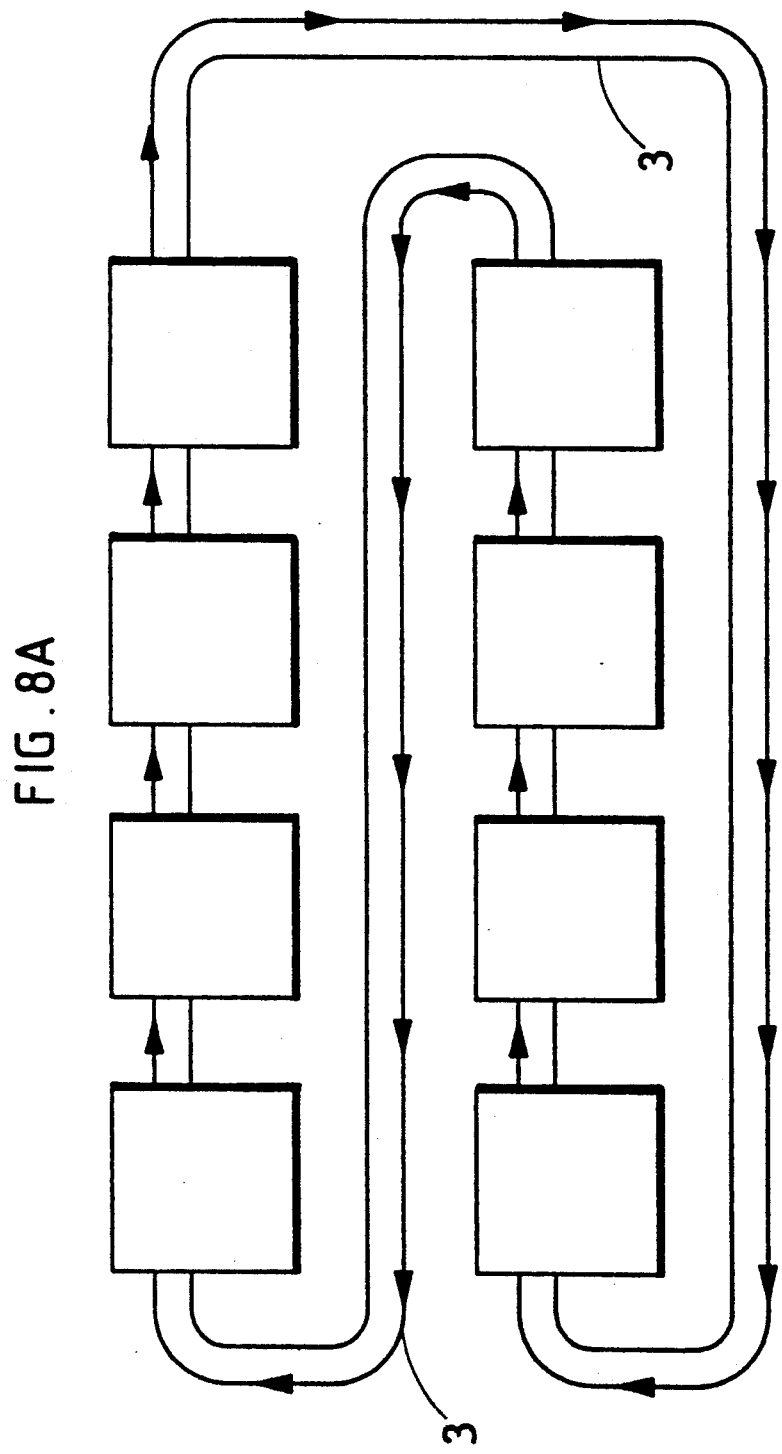
Figure 8C:
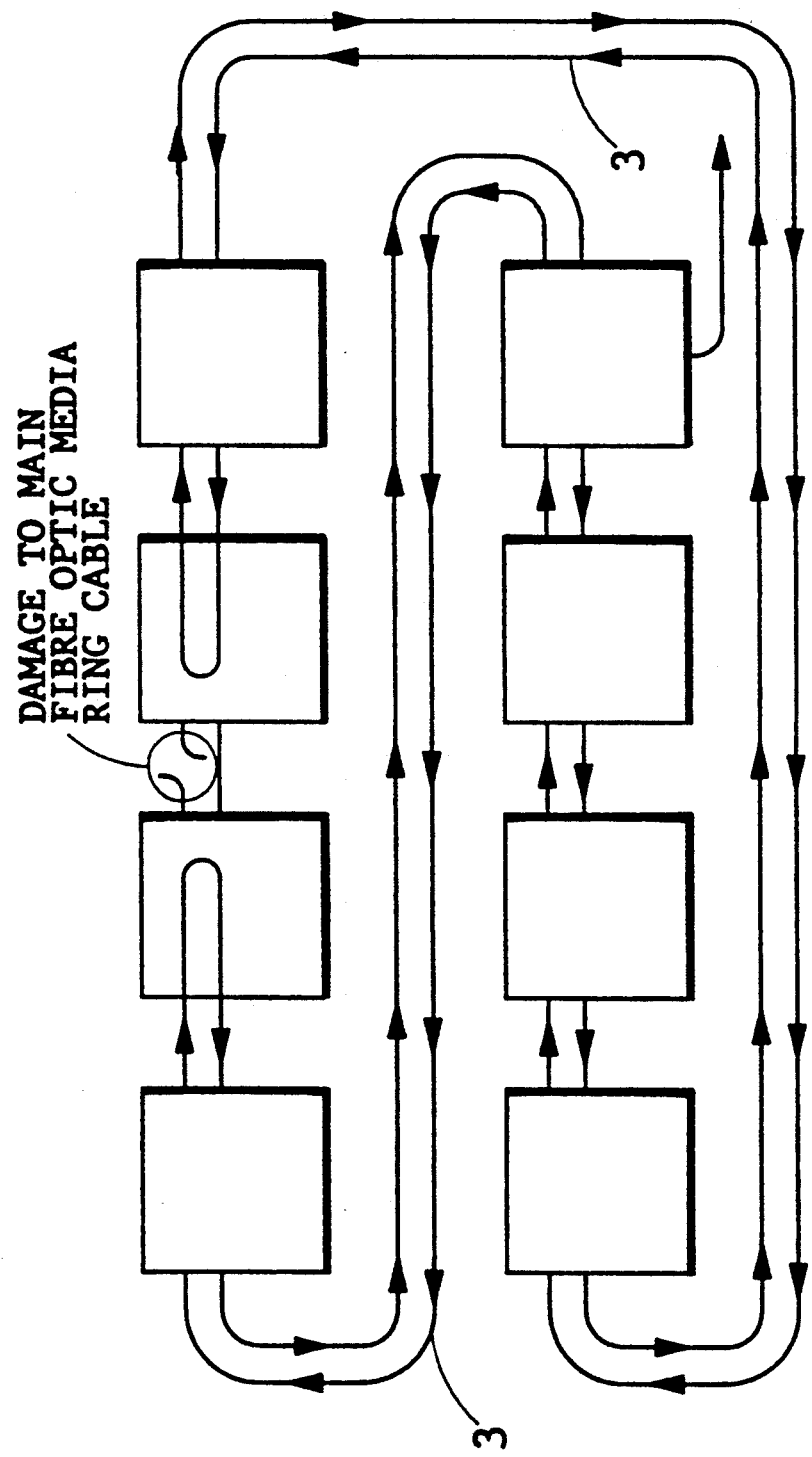
Figure 9:
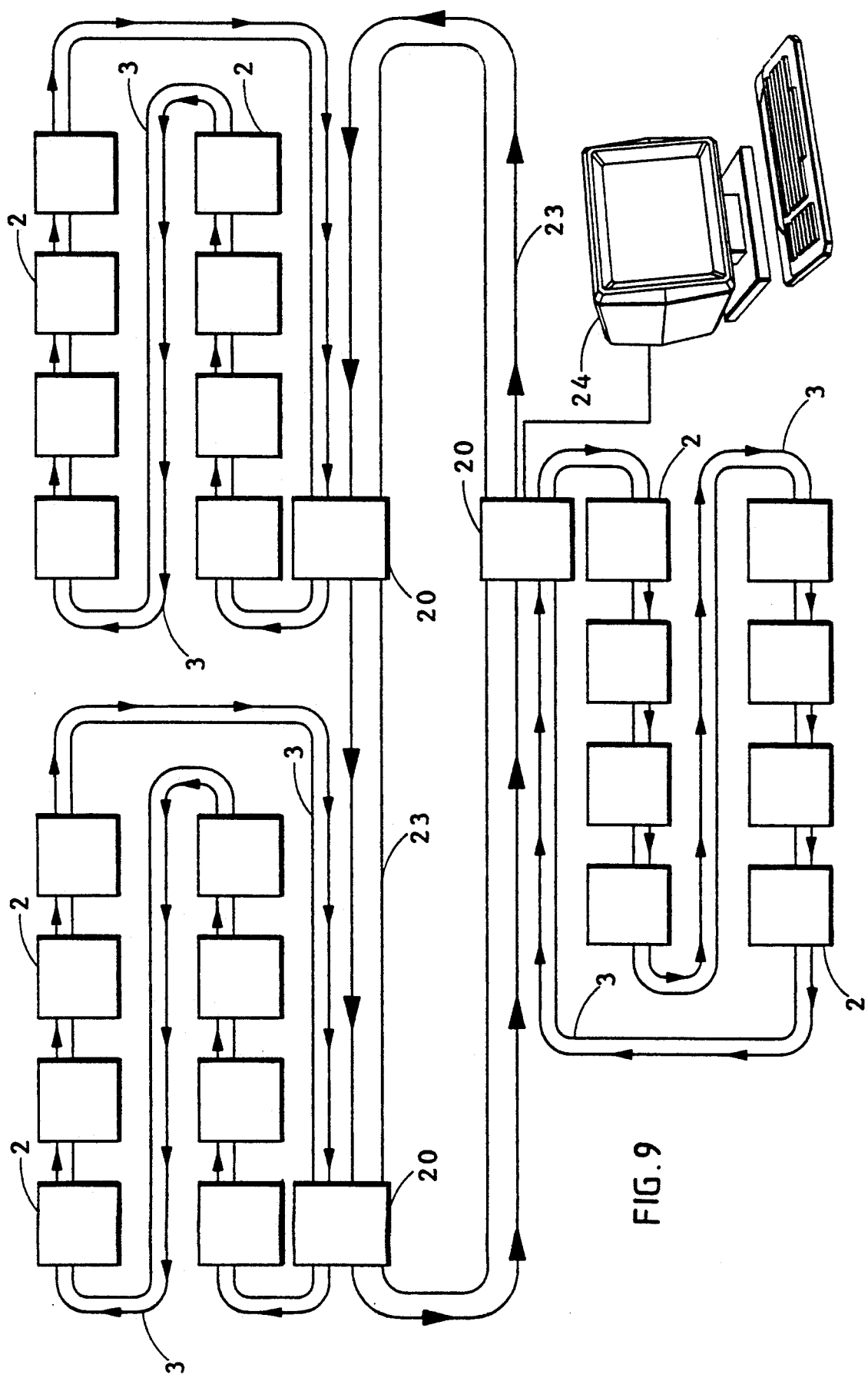

FIGS. 8A-C show embodiments of the invention incorporating a dual ring, FIG. 8A shows normal operation, FIG. 8B shows a loop-back recovery following a node failure and FIG. 8C shows a loop-back recovery following a transmission media failure; and FIG. 9 is a block diagram which shows a typical configuration of a plurality of interconnected independent dual ring systems.

Referring firstly to FIG. 1 a preferred embodiment of a voice and data ring communication system 1 comprises a plurality of nodes or terminal access units 2 which are interconnected by a media ring 3. The media ring will preferably comprise an optical fibre link with the terminal access units incorporating opto-electronic devices. The terminal access units may be adapted either to transmit or receive information, or to transmit and receive, and for the purpose of further explanation it is assumed that the latter, that is capable of both transmission and reception, is possible at each unit 2. In order to provide a plurality of channels a time division multiplexing system operates in which system time frame packets are generated by one of the terminal units 2, but in the present invention the multiplexing is organised so as to enable a transmit/receive real time correlation and provide a plurality of voice channels as well as a plurality of data and telemetry channels.

FIG. 2 illustrates schematically a system time frame packet according to one embodiment of the invention. The frame starts with a header which contains routing information and time slot allocation information relating to the individual bytes in the usable time slot field, each of the n bits or bytes being separately assigned to constitute an individual channel. This is in contrast to the usual manner of channel allocation in the prior art in which a complete time frame is used as a single channel, or the channel slots within a time frame are allocated through arbitration.

The allocation of the bits or bytes is such that several consecutive bits or bytes may be assigned together to a 'compound' channel capable of carrying parallel or multi-input/output data paths.

Preferably the time frame packet is subdivided as shown in FIGS. 3a and 3b, in which the available time field is divided into a first section that provides synchronous allocated time slots, which can be used for voice and synchronous data transmission, and a second section for asynchronous or random access channels that are used for data transmission and need not be pre-assigned.

FIG. 3a shows the breakdown of the synchronous time slot field which assigns bits or bytes as individual channels and FIG. 3b shows a typical breakdown of a random access channel, of which there may be one or more in addition to the synchronous time slot field. In FIG. 3b the following abbreviations have been used: SOP—Start of Frame; DA—Destination Address; SA—Source Address; SCS—Frame Check Sequence; EOF—End of Frame. In the Figures the synchronous and asynchronous channels are shown in separate blocks, however the bits and bytes may not always be assigned in that order and the bits and bytes relating to the synchronous and asynchronous channels may be interleaved.

The system time frame packets are generated by one of the terminal access units 2 that operates as a master device, typically the complete time frame packet being 125 microseconds duration, and the master device also assigns the single bit or byte time slots that form the header, remaining unassigned slots forming the data field. A system processor device associated with each terminal access unit organises the usable data field using decoded header information for routing information and extracting data required at that terminal unit. Data required at other units is retransmitted along with any additional data transmitted from that unit, with suitable recording of the data field to accommodate the changes. The detailed operation of the processor and its communication with other parts is described in more detail later.

Figure 4:
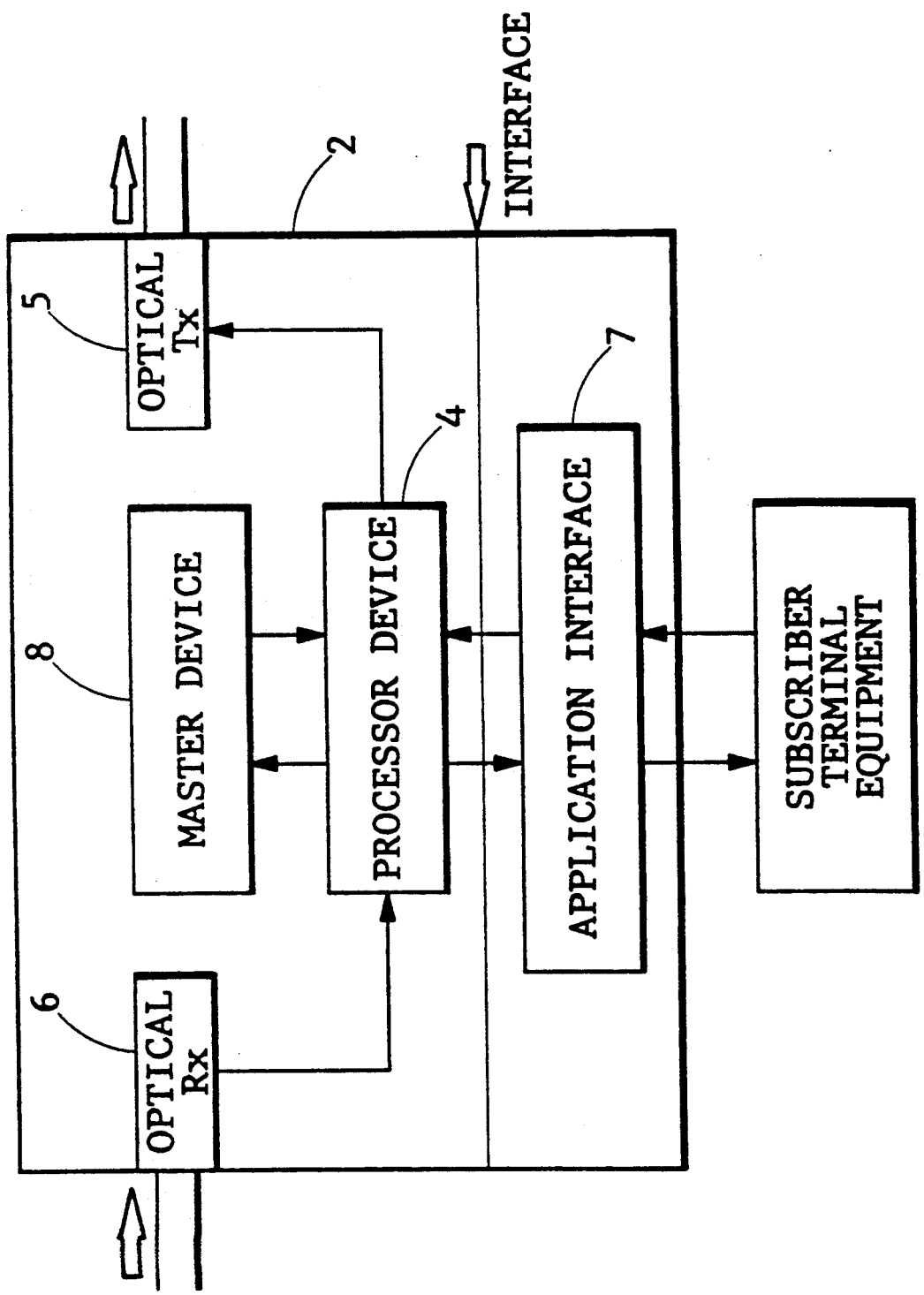
FIG. 4 is a block diagram of major functions of a terminal access unit of an embodiment of the invention.

FIG. 4 shows a typical terminal access unit 2 comprising a processor device 4 which is connected to a respective transmitter 5 and receiver 6, which are each connected to the optical fibre media ring 3. The processor device is also connected to an application interface device 7 via which apparatus such as microphones, headphones or computers are connected to exchange information. At least one, and preferably several, of the terminal access units also comprise a master device 8. When the system is started up each master device 8 in the system media ring commences transmitting system time frame packets including its own unique header code into the media ring. The master devices are programmed to recognise a header code priority sequence, in the present embodiment lowest taking precedence, and when a master device receives a system time frame packet with a higher priority (lower code) in the header, it switches to a non master role and simply relays the time frame packets received and ceases to generate time frame packets. By the time a frame packet generated from a given master device has travelled the full media circuit back to its originating master device, that device will have received a time frame packet from all other master devices and will have switched from master device mode if a high priority header has been received. Thus when an operating master device receives its own header code it is established that it has the highest priority and it will become the operational system master device, all others having switched to being passive master devices. In passive mode the timing for time frame packets is relayed to the processor rather than generated in the passive master device. The passive master devices continue to check the operation of the system master and in the event of failure of the operational system master they all recommence transmission of time frame packets and the start up arbitration process to establish a new system master is repeated.

When operating as system master device, the master device initiates and controls system time frame packets and may provide additional processing operations on received data. In particular the master device may be programmed to pass on a received packet unchanged, to cancel data or to swap data locations or be programmed to manipulate these operations.

The master device and processor device are shown in more detail in FIGS. 5 and 6. The main clock generating and clock logic circuits 10 are located in the processor unit and are connected to a biphase decoder 11 which decodes incoming optical signals from the media ring. Local bit, byte and system time frame timing signals generated by the clock generator are synchronised by the clock logic with the incoming system time frame clock, and data bits from the biphase decoder are presented as groups of bytes via buffer circuits 12 to a FIFO scheduler 13 in the master device and to a general backplane bus. If the master device is the operational system master the incoming system time frame packet is inhibited from passing directly to the backplane bus and the master device buffers the bytes, resets the system timing and then sends them to the processor device backplane bus. If the master device is passive the incoming bytes pass from the biphase decoder buffer to the processor backplane bus and the output from the master device buffer to the processor backplane bus is inhibited.

Clock signals recovered by the biphase decoder 11 are sent to an operation scheduler 14 which outputs an operation code for an address generator 15. The operation scheduler and address generator control the routing of the groups of bytes input to the backplane bus as they pass from component to component in the system. The operation scheduler also interfaces with the terminal's application interface through which information is exchanged.

As mentioned previously, each byte may constitute a separate channel and therefore the data bits are allocated in such a way that each byte can be processed independently of the other bytes in the system time frame packet. The operation scheduler, which comprises a byte counting state machine having a preprogrammed look up table, allocates subscriber data into the appropriate system time frame byte (according to the preprogramming) by synchronising the arrival of the system time frame packet byte and the subscriber data byte at the bit/byte processor with availability of the system time frame packet byte from the biphase decoder buffer circuits or master device (depending upon which one is establishing the system time frame). Each terminal unit's state machine is programmed to access only those time slots in the packet that are assigned to that terminal unit.

When a byte is released from the biphase decoder buffer circuits 12, the operation scheduler releases a corresponding data byte. The byte released by the operation scheduler may either contain no information because the terminal is not transmitting information in that byte, or it may contain information to be transmitted which has been communicated to the operation scheduler via the applications interface. The bytes output respectively by the buffer circuits 12 and operation scheduler are sent via the backplane bus (the address generator using the sequencing of the individual bytes to control the routing) to a bit/byte processor 17.

In the bit/byte processor the byte originating from the incoming system time frame packet is processed to read information addressed to that terminal, and if the information is addressed only to that terminal it is removed. The processor then performs a Boolean function to combine the processed incoming system byte (which may or may not contain information) with the byte from the operation scheduler and sends an output byte to the backplane bus addressed to an output latch 18 of a biphase encoder 19.

In the biphase encoder the bytes are sequentially encoded to reform the original system time frame packet under the control of the clock generator and clock logic. The newly encoded system time frame packet is then input to an optical transmitter and launched into the media ring.

If the incoming system time frame byte input to the bit/byte processor contained information addressed to the terminal, that information is sent to information handling equipment within the application interface device. The application interface device may be integral with or separate from the terminal unit, bytes are transferred with address codes via the backplane bus common with the processor device. Control equipment such as a keyboard along with switching from subscriber apparatus send selection signals to the operation scheduler in the processor device.

A typical voice communication terminal access unit is shown in FIG. 7. Voice communication is achieved by an audio processor receiving microphone signals from subscriber equipment and converting them to a digital form. The audio processor also receives microphone signals that are already present within the system time frame packet that has been specifically programmed to carry microphone signals. In the terminal that is transmitting microphone signals the state machine in the operation scheduler identifies the byte channel in the system time frame packet that is to carry digitised microphone signals. The digital microphone signal is sampled and written to the audio processor, where it is digitally mixed with any other digitised microphone signal that is in the system. The byte containing the mixed digital microphone signal is sent back to the operation scheduler in step with the original system time frame byte that was sampled in the first place, that byte having been buffered for one byte period (1.6 microseconds) which is the time taken for the read, audio mixing and writing cycle. From the operation scheduler the audio signal byte and system time frame byte are sent to the bit/byte processor where they are merged to become the reformed system time frame byte now carrying the mixed digitised microphone signals.

The system time frame packet complete with the mixed microphone signal now passes in turn through each of the other terminal units, some of which may add (but not overwrite) more microphone signals, until it reaches the terminal which has the operational master. When the operational master status signal is present the system time frame bytes are passed to a state machine within the master device. This state machine is similar to the one in the processor device and is preprogrammed to look up the byte in the packet that is carrying the microphone signal and to read and remove it from the packet leaving the microphone byte slot empty. The state machine also looks up the byte that is preassigned as the headphone byte slot and writes the microphone signal into it. Again this process is transacted in one bit period and the system time frame packet byte is returned to the processor device in the correct place and schedule and is processed as described earlier for information to be added or extracted. After processing the system time frame packet is transmitted back on to the ring and again passes in turn through all the terminals. New microphone signals may be entered into the empty microphone byte and the microphone signals collected on the previous cycle that have now been transferred to the headphone byte can be sampled and decoded by those terminals which have audio processing application devices with access to that particular headphone byte in the system time frame packet. It will be realised that there may be a plurality of microphone and headphone byte pairs with different access allocations. The transmitting terminal also receives back its own microphone signal as confirmation of transmission.

When a phone signal addressed to a particular terminal is received by a terminal the processor device outputs it to the audio processor where it is demodulated and sent to earphones.

Some parts of the master device in each terminal function in conjunction with the processor device and may alternatively be placed in the processor. Other parts perform operations only when the master device is operating as the system master device.

In a preferred embodiment of the invention, shown in FIG. 8, the media ring (which is typically an optical fibre ring) is provided with a parallel standby ring 3'.

The standby ring is connected in a manner similar to the main media ring 2, but under normal operating conditions instead of data packets carries only a standing light path around the ring in the opposite direction from the propagation of the data packets in the main ring. This state is represented in FIG. 8a, with the arrows on the media and standby rings indicating the directions of propagation.

Should damage occur to either a terminal access unit 2, or to the main media ring then the terminal access units on each side of the damaged portion sense failure and 'loop-back' by passing the time frame packets to the standby ring rather than onward to the damaged portion. The standby ring then carries the system time frame packets back via the other terminal access units to the unit at the other side of the damaged portion, thus completing a new circuit path. This situation is shown in FIGS. 8b and 8c respectively for terminal access unit failure and main media ring failure. Once the damaged portion is repaired the standby ring ceases to transmit the packets and normal operation is resumed.

In the event of two, unadjacent failures the ring becomes fragmented. In this instance each surviving ring fragment loops back to form a communication ring among the remaining fragment. Arbitration to establish a new master device in a fragment severed from the original master device will occur when the original master code ceases to be received.

FIG. 9 illustrates a further embodiment of the invention in which a plurality of independent media ring systems are interconnected via bridge units 20, and associated main bridge media ring 23 and standby bridge media ring 23'. The bridge units 20 and media rings 23, 23' operate in a manner comparable to an individual media ring system with bridge units 20 corresponding to terminal access units 2 and the bridge media rings 23,23' corresponding to media rings 3,3'. The bridge units 20 have their own preprogrammed time frame packet protocol for the bridge media ring and can be regarded as two terminal access units, one in the independent media ring and one in the bridge media ring, operating back-to-back and connected together by their application specific devices which are configured to exchange selected information between the independent media ring time frame packets and the bridge media ring time frame packets. The selection of information exchange can be set into the electronic firmware of the bridge unit or by controlling software on a system management computer terminal 24 connected to one of the bridge units. The individual media ring systems are able to exchange information via the bridging media ring. Each individual media ring and bridging ring (of which there may be more than one in a network) maintains its own individual master control throughout operational use.

I claim:

1. A ring transmission system comprising a plurality of access nodes and a data transmission medium on which data is transmitted between access nodes in a series of multi-bit time frame packets;

each access node having a terminal access unit and each terminal access unit having predetermined access to specific time slot channels within the time frame packets;

a plurality of the terminal access units being capable of operating as a system master device and transmitting a priority code sequence to arbitrate which of said plurality of terminal access units is to become the operating system master, all other terminal access units functioning as slaves, the transmission of the code sequence and arbitration occurring on system start up and also in the event of failure of the operating system master;

the operating system master generating said multi-bit time frame packets and providing each with a header with which local clocks in the slave access units synchronize;

and in which information input to the ring by the terminal access units is allocated to specific transmission time slots within the time frame packet in accordance with said predetermined access, the data in the transmission time slots being removed at the operating system master, placed in reception time slots and retransmitted in the time frame packet to be received and decoded by terminal access units having predetermined access to the reception time slots.

2. A ring transmission system according to claim 1 in which each terminal access unit includes a preprogrammed state machine that controls access to the specific time slots assigned to that particular terminal access unit, the time frame packet incoming to the terminal access unit being buffered for a predetermined interval during which data transfer for the accessed time slots takes place, after which the original time frame packet is merged with the accessed time slots.

3. A ring transmission system according to claim 1 in which a plurality of terminal access units can access the same time slot for transmission of information, information from a respectively subsequent terminal access unit augmenting information input by a respectively preceding terminal access unit.

4. A ring transmission system according to claim 1 in which the ring is interconnected to another ring via a bridging unit, the bridging unit comprising a terminal access unit of each ring interconnected via application specific devices which are configured to exchange selected information.

* * * * *